Dec. 13, 1955  P. X. GORIN  2,726,524
FRICTION DRIVE COUPLING WITH OVERLOAD SLIP
Filed Sept. 23, 1953

*INVENTOR.*
PAUL X. GORIN
BY
ATTORNEYS

2,726,524

FRICTION DRIVE COUPLING WITH OVERLOAD SLIP

Paul X. Gorin, Philadelphia, Pa.

Application September 23, 1953, Serial No. 381,903

5 Claims. (Cl. 64—30)

This invention relates to a friction drive coupling providing overload slip and, more particularly, to a friction drive coupling for mounting tools such as, for example, a saw blade, on a power driven drive shaft.

It is frequently desirable that apparatus such as, for example, saw blades, milling cutters, lawnmower blades, driven pulleys, and other driven means to be mounted in such a manner that, upon the occurrence of an overload upon the driven member, slippage may occur between the driven member and the means driving the driven member. It is frequently necessary that such friction drive couplings occupy a limited space in order to provide a maximum clearance with respect to the means which they are driving. It is further necessary that such friction drive couplings be adjustable in order that release will occur at a selected load value and further, in order that accommodation may be made for wear after repeated slippage has occurred.

It is also necessary that the mounting be rigid. This is particularly true in mounting tools such as, for example, saw blades, which must run true and not be subject to flutter. Thus the mounting should include no rubber bushings or other yielding means which would permit motion of the driven member. It is also noted that the absence of rubber or other yielding bushings will prevent the occurrence of a kickback or spring action in the mounting between driving and driven members. It is further necessary that the mounting be neither tightened nor loosened either by the application of load on the driven member or by slippage taking place between the driving and driven members.

It is the primary object of the present invention to provide a friction drive coupling accommodating the considerations noted above and to provide by a simple mechanism a solid mounting involving substantially non-yielding parts by means of which driving power may be transmitted from a driving member to a driven member. The foregoing and other objects of the invention will become apparent from the following description when read in conjunction with the accompanying drawing, in which.

Figure 1:
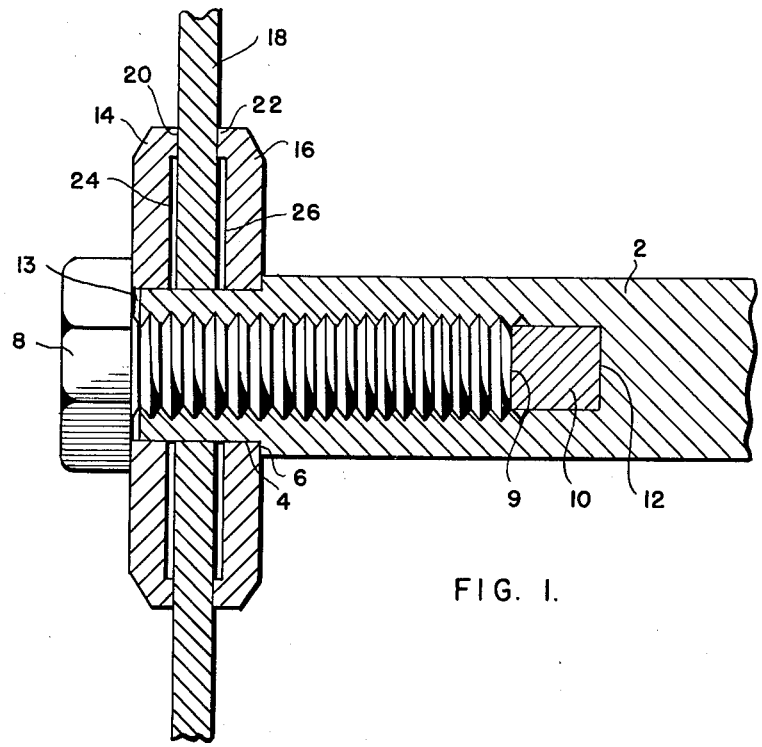
Figure 1 is an axial section through an embodiment of the invention.

Referring to Figure 1 there is shown a shaft 2 which is adapted to be driven at its right-hand end, as viewed in the figure, by any suitable driving means. The left-hand end portion of the shaft 2 is of reduced diameter as indicated at 4 providing a radially extending shoulder 6. The left-hand end portion of the shaft 2 is bored and tapped to receive a bolt 8. A block 10 is positioned at the base 12 of the bore and provides a seat engaged by the inner end 9 of the bolt 8. Thus the bolt 8 will enter the bore within the shaft 2 to the extent limited by the block 10 and, when the bolt 8 is tightened, it will be in firm engagement with the block 10 which, in turn, bears upon the bottom 12 of the bore. Thus the depth to which the bolt 8 may be threaded into the bore will depend upon the length of the bolt 8, the length of the block 10 and the depth of the bore in the bolt 2. In the parts shown, these proportions are such that a space 13 is provided between the head of the bolt 8 and the left end of the shaft 2.

Mounted on the reduced diameter portion 4 of the shaft 2 between the radially extending shoulder 6 and the inner face of the head of the bolt 8 is a pair of retaining members 14 and 16 between which is positioned a member 18. The member 18 may be a cutting tool, such as a saw blade or milling cutter or, alternatively, may be a pulley mounting member or any other member which is to be driven. The members 14 and 16 may be provided with inwardly extending annular portions 20 and 22 adjacent to the peripheral faces thereof. These portions 20 and 22 provide restricted engaging surfaces between the members 14 and 16 and the member 18.

This arrangement has two inherent advantages. First, the reduced area of surface contact insures firm contact at the radially outermost portions of the members 14 and 16 with the member 18 and thus the member 18 is firmly clamped at the greatest radial distance from the center of rotation thereof thereby reducing the possibility of flutter and uneven support. Furthermore, there is provided by the members 14 and 16 a very slight yielding between the shoulder 6 of the shaft 2 and the head of the bolt 8. Thus, to a slight degree the critical accuracy of the lengths of the bolt 8 and the block 10 with regard to the depth of the bore in the shaft 2 is relieved. This yielding condition, however, is insufficient to give rise to any flutter in the member 18. This will be appreciated when it is considered that the mounting shown with regard to the members 14 and 16 and the member 18 is widely employed in mounting high speed power driven rotary sawblades.

If desired, the engaging surfaces at the shoulder 6 and beneath the head of the bolt 8 may be roughened in order that slippage upon overload will occur between the portions 20 and 22 of the members 14 and 16 and the mounted member 8 rather than occurring on the shaft 2. This locating of the region of slippage is desirable in order that wear occurring during slippage be minimized. A film of oil may be provided between the parts upon assembly. If desired the spaces 24 and 26 between the members 14 and 16 and the member 18, respectively, may be filled with grease or other suitable lubricant when the parts are assembled in order to insure the existence of lubrication between the slipping members when an overload occurs.

Adjustment of the mounting means is accomplished by selecting a block 10 of suitable dimensions or, alternatively, by either adding shims in order to relieve loading between the members 14 and 16 and the member 18 or by filing the block in order to increase the loading between the members 14 and 16 and the member 18. It will be evident that the block 10 is not necessarily employed. The bolt 8 may seat directly upon the bottom 12 of the bore. The block is desirably employed, however, in that it may be made of a soft material which may be readily filed or worked when adjustment of the mounting means is to be made. It will be apparent that the parts will be originally assembled with the desired loading existing between the clamping members 14 and 16 and the member 18, and thereafter, to compensate for wear, it will only be necessary to file the block 10 in order to permit the bolt to enter the bore in the shaft 2 to a slightly greater degree in order to restore the original loading between the clamping members 14 and 16 and the driven member 18.

Figure 2:
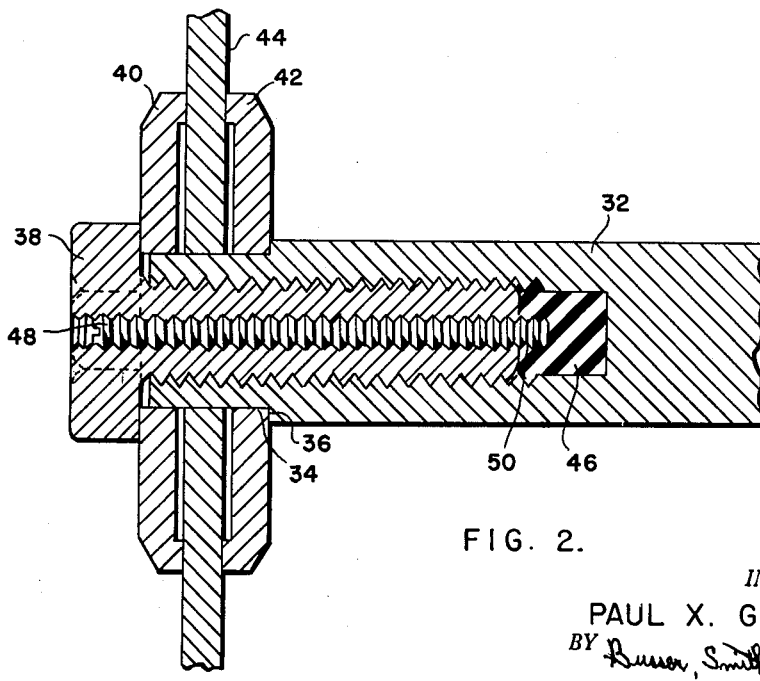
Figure 2 is an axial section through an alternative embodiment of the invention.

In Figure 2 there is shown an alternative embodiment of the invention including a shaft 32 which is provided with a reduced diameter portion 34 at its left-hand end providing a radially extending flange 36. A bolt 38 enters a tapped bore in the shaft 32. Between the head of the bolt 38 and the radially extending flange 36 there is positioned a pair of clamping members 40 and 42, respectively, between which there is supported a member 44. The member 44, similarly as the member 18, may be, for example, a saw blade or other type of driven member.

The bolt 38 is provided with a central threaded bore through which there extends a screw 48. The right-hand end of the screw 48, as indicated at 50, extends beyond the right-hand end of the bolt 38 and into a block 46 which is positioned between the right-hand end of the bolt 38 of the base of the bore in the shaft 32. The block 46 may be formed of soft rubber or other deformable but incompressible material. Thus, when the bolt 38 is threaded into the bore 32, it seats upon the block 46 which acts as a solid member equivalent to the block 10 shown in Figure 1.

When it is desired to make an adjustment in the position of the bolt 38, the degree of extension of the screw 48, as indicated at 50, into the deformable block 46 may be adjusted, thus varying the resultant position of the bolt 38 when it is seated upon the block 46. For example, if it is desired to move the bolt 38 inwardly increasing the clamping pressure exerted by the clamping means 40 and 42 upon the member 44, the screw 38 will be backed out slightly thus relieving the displacement existing in the deformable member 36 and providing increased volumetric space for the block 46. Thereafter the bolt 38 may be moved inwardly for the distance required to take up this increased volumetric space at which point, of course, the bolt 38 will be solidly seated upon the incompressible block 46. Conversely, if it is desired to reduce the pressure upon the clamping members 40 and 42, the bolt 38 will be first backed out of the threaded bore, the screw 48 will then be turned inwardly to a greater degree and, thereafter, the bolt 38 will be turned inwardly. The result of the increased dimension of the end portion 50 of the screw 48 into the space beyond the end of the bolt 38 will reduce the extent to which the bolt may be returned into the threaded bore and thus effect a reduction in loading upon the members 40 and 42 between the radially extending portion 36 and the underside of the head of the bolt 38.

By way of example, this type of coupling would find a desirable application in the case of portable hand operated power driven wood saws which are subject to seizing or binding upon, for example, a knot in the wood or a nail or other obstruction which may cause the blade rotation to be arrested. In the absence of such a slipping coupling, the result of such an occurrence would be a sudden shock to the drive mechanism and a shock to the entire portable saw assembly which frequently results in extreme hazard to the user. By incorporating a friction drive coupling such as has been described, both the shock and the hazard resulting from such an occurrence is avoided.

It should be noted that in a conventional mounting of, for example, a saw blade employing a bored shaft and a bolt entering the bore, the head of the bolt seats firmly upon the blade clamping means and does not seat on the base of the threaded bore. Thus any slippage of the saw blade with respect to the shaft tends to rotate the bolt which is so arranged, of course, as to be tightened by such slippage. In my mounting the bolt seats firmly in the base of the bore and cannot be rotated by the mounted member.

With regard to the form of the invention shown in Figure 2, it should be noted that the arrangement permits minute changes in pressure on the mounted member to be made by adjustment of the screw 48. The location of the screw 48 is, of course, not limited to that shown. The most convenient location is that shown in that it provides accessibility of the head of the screw 48. The screw may, however, if desired, be passed radially through the shaft 32 and into the block 46. The only disadvantage in this latter arrangement might result from shaft unbalance due to the presence of the screw in a radial position.

It will be evident that various driven members may be incorporated with the present invention and that the clamping means therefor, and the relation of the frictionally engaging surfaces through which the driving is accomplished and between which the slippage will take place, may be variously modified without departing from the scope of the invention as set forth in the following claims.

What is claimed is:

1. A friction drive coupling providing overload slip comprising driving means, driven means rotatably mounted on said driving means, means providing a frictional driving connection between said driving means and said driven means, a threaded bore in said driving means, a bolt adapted to enter said bore and to engage the threads therein and to engage said frictional driving connection providing means to establish the pressure existing in said frictional driving connection in relation to the degree of entry of the bolt into said bore, and incompressible deformable spacing means within said bore engaged by said bolt locking said bolt in position within said bore to prevent rotation of said bolt with respect to said bore and to limit the degree of engagement between said bolt and said bore to establish the pressure existing in said frictional driving connection.

2. A friction drive coupling providing overload slip comprising a drive shaft, means rotatably mounted on and frictionally driven by said drive shaft, a threaded bore extending into one end of said drive shaft and having a base, a spacer seated on said base, a bolt entering said threaded bore engaging threads therein and seating on said spacer, a shoulder on said drive shaft, a head on said bolt, said driven means being positioned between the head of said bolt and said shaft shoulder, means for adjusting the thickness of the spacer between the bore base and said bolt, the pressure existing in said frictional engagement being established by the spacing between the head of said bolt and said shaft shoulder, said spacing being adjustable by adjustment of the thickness of said spacer.

3. A friction drive coupling providing overload slip comprising a drive shaft, means rotatably mounted on and frictionally driven by said drive shaft, a threaded bore extending into one end of said drive shaft and having a base, an incompressible deformable spacer seated on said base, a bolt entering said threaded bore engaging threads therein and seating on said spacer, a shoulder on said drive shaft, a head on said bolt, said driven means being positioned between the head of said bolt and said shaft shoulder, the pressure existing in said frictional engagement being established by the spacing between the head of said bolt and said shaft shoulder, means providing adjustable displacement means entering the region of the bore occupied by said spacer and deforming said spacer, the spacing between the head of said bolt and said shaft shoulder when said bolt is firmly seated on said spacer being determined by the extent of entry of said displacement means into the region of the bore occupied by said spacer.

4. A friction drive coupling providing overload slip comprising driving means, driven means rotatably mounted on said driving means, means providing a frictional driving connection between said driving means and said driven means, said driving means including threaded receiving means, pressure establishing means including threads adapted to engage the threads of said receiving means for engaging said frictional driving connection providing means and establishing the pressure existing in said frictional driving connection in relation to the degree of engagement existing between the threads of said engaging means and the threads of said receiving means, said receiving means including a cavity, incompressible deformable spacing means positioned within said cavity and adapted to be engaged by said pressure establishing means to prevent rotation of said pressure establishing means with respect to said receiving means and to limit the degree of engagement between the threads of said receiving means and the threads of said engaging means to establish the pressure existing in said frictional driving connection, and means for adjusting the volume of said cavity without changing the relative positions of said pressure establishing means and said receiving means.

5. A friction drive coupling providing overload slip comprising a drive shaft, means rotatably mounted on and frictionally driven by said drive shaft, a threaded bore extending into one end of said drive shaft and having a base, a removable spacer seated on said base, a bolt entering said threaded bore engaging threads therein and seating on said spacer, a shoulder on said drive shaft, a head on said bolt, said driven means being positioned between the head of said bolt and said shaft shoulder, the pressure existing in said frictional engagement being established by the spacing between the head of said bolt and said shaft shoulder, said spacing being adjustable by adjustment of the thickness of said spacer.

References Cited in the file of this patent

UNITED STATES PATENTS

| | | |
|---|---|---|
| 981,315 | Rogers | Jan. 10, 1911 |
| 2,089,410 | Olson | Aug. 10, 1937 |
| 2,156,047 | Arnold et al. | Apr. 25, 1939 |
| 2,586,530 | Godfrey | Feb. 19, 1952 |